March 2, 1926.
H. L. BRADLEY
KNOB SECURING MEANS
Filed April 21, 1922
1,575,410
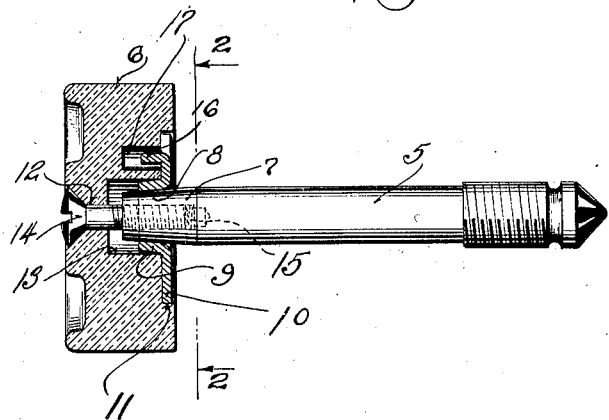
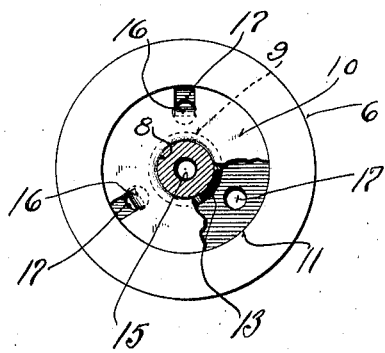
Inventor:
Harry L. Bradley
By Ira M. Jones
Attorney.

Patented Mar. 2, 1926.

1,575,410

UNITED STATES PATENT OFFICE.

HARRY L. BRADLEY, OF MILWAUKEE, WISCONSIN, ASSIGNOR TO THE RELIANCE COMPANY, OF MILWAUKEE, WISCONSIN, A CORPORATION OF WISCONSIN.

KNOB-SECURING MEANS.

Application filed April 21, 1922. Serial No. 555,881.

*To all whom it may concern:*

Be it known that I, HARRY L. BRADLEY, a citizen of the United States, and resident of Milwaukee, in the county of Milwaukee and State of Wisconsin, have invented new and useful Improvements in Knob-Securing Means, of which the following is a description, reference being had to the accompanying drawings, which are a part of this specification.

This invention relates to certain new and useful improvements in knob securing means and refers more particularly to means for attaching a knob, hand wheel, operating member, or the like, to a shaft whereby accidental detachment of the knob, or the like, from the shaft is prevented.

The most commonly employed manner of securing a knob, hand wheel, operating member, or the like, to a shaft consists in forming a centrally bored boss or shank on the knob or the like which engages over the end of its shaft and is keyed or locked thereto by means of a set screw. This construction has proven highly objectionable in that ordinary vibration soon loosens the knob, or the like, and consequently the knob slips on the shaft and is often times entirely detached.

It is, therefore, a primary object of this invention to provide improved means for attaching a knob, hand wheel, operating member, or the like, to a shaft whereby the knob or the like, is firmly and rigidly attached to its shaft and possibility of accidental detachment thereof, due to the vibration or other causes, is reduced to a minimum.

This invention has for another of its objects to provide means for firmly securing a knob, hand wheel, operating member, or the like, to a shaft wherein the knob or the like, is frictionally secured to the shaft to eliminate posibility of the knob, or the like, from turning free of the shaft.

It is a further object of this invention to provide an improved manner of attaching a knob, hand wheel, operating member, or the like, to a shaft by tapering the end thereof and inserting same into an aperture of a knob, or the like, carried member, the tapered shaft end being tightly drawn into the aperture by a securing member passed through the knob, or the like, and engaging the shaft.

A still further object of this invention resides in the provision of a device of the character described in which the knob proper may be molded or stamped out of any suitable material and the shaft engaging part or member thereof stamped out of sheet material, whereby quantity production is made possible at a minimum cost.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a sectional view taken through a knob, hand wheel, operating member, or the like, embodying my invention, the shaft to which the knob, or the like, is secured being in elevation, and Figure 2 is a view, partly in section and partly in elevation, taken through Figure 1 on the plane of line 2—2.

Referring now more particularly to the accompanying drawing, the numeral 5 designated a shaft of any suitable type and adapted to have a knob, hand wheel, operating member, or the like, 6 secured to its upper end by the means now about to be described. The outer end of the shaft is tapered, as at 7, to fit within an aperture 8 formed in the boss 9 of a plate 10, which nests within a depression or recess 11 in the inner face of the member 6.

The member 6 has an aperture 12 which extends therethrough and is counter-bored or recessed at its inner end, as at 13, to accommodate boss 9, a screw or other securing member 14 passing through aperture 12 and engaging in a threaded bore 15 in the tapered end of the shaft, whereby member 6, and consequently plate 10, is firmly forced over the shaft.

The bore 8 of boss 9 is preferably tapered to correspond somewhat with the taper of the shaft end 7 so that when plate 10 is forced on the shaft, with member 6, said plate will be frictionally secured to the shaft against rotation, as well as detachment. In order to eliminate the possibility of member 6 rotating about plate 10, one or more plate carried prongs or projections 16 are provided which engage in recesses 17 formed in member 6, as best illustrated in Figure 1.

Plate 10 is preferably stamped from a single piece of material, projections 16 being formed by striking peripheral portions of the plate laterally and boss 9 being formed by pressing the medial portion of the plate outwardly, thus permitting the manufacture of the plate in quantities at a minimum cost. The member 6 is also capable of being formed very cheaply by either molding or stamping any suitable material, as will be readily apparent to those skilled in the art to which an invention of this character appertains.

What I claim as my invention is:

1. A device of the character described, comprising an operating member provided with a two diameter bore, a plate stamped from bendable metal, a round instruck apertured boss formed on the plate by striking the medial portion thereof inwardly and adapted to be disposed in that portion of the operating member bore having the larger diameter, said boss having a tapered bore therein, a shaft having a round tapered end insertable in the tapered bore of said boss, an instruck projection on the plate engaging in a recess in the operating member to prevent rotation of the plate with respect to the operating member, and a securing screw inserted through the smaller portion of the bore in the operating member and engaging in a threaded opening in the end of the shaft to draw the shaft end into the boss aperture and secure the plate and the operating member thereon against rotation solely by reason of the frictional engagement between the tapered shaft and the tapered bore.

2. A device of the character described, comprising a spindle having an outer end of conical shape, an operating member for the spindle and having its rear face provided with a central recess, a clamp plate, a central substantially conical enlargement formed on the central portion of the plate and having a bore of a shape complementary to the shape of the conical end of the spindle, the plate fitting against the recessed side of the operating member with its conical enlargement disposed in the recess, and an attaching screw passed through the operating member at the bottom wall of the recess and threaded into the conical end of the spindle to clamp the operating member between the plate and attaching screw and cause the bore of the plate enlargement to strike the taper of the spindle end disposed therein to secure the operating member on the spindle against rotation.

In testimony whereof I affix my signature.

HARRY L. BRADLEY.